J. F. PROCK.
AUTOMATIC REGISTER.
APPLICATION FILED SEPT. 15, 1913.

1,122,029.

Patented Dec. 22, 1914.
5 SHEETS—SHEET 2.

Witnesses:
Stanley A. Barny
Wm. Hurt

Inventor
Joseph F. Prock
by Banning & Banning
Attys.

J. F. PROCK.
AUTOMATIC REGISTER.
APPLICATION FILED SEPT. 15, 1913.

1,122,029.

Patented Dec. 22, 1914.
5 SHEETS—SHEET 3.

Witnesses:
Stanley A. Baring
Wm Hunt

Inventor
Joseph F. Prock.
by Banning & Banning
Attys.

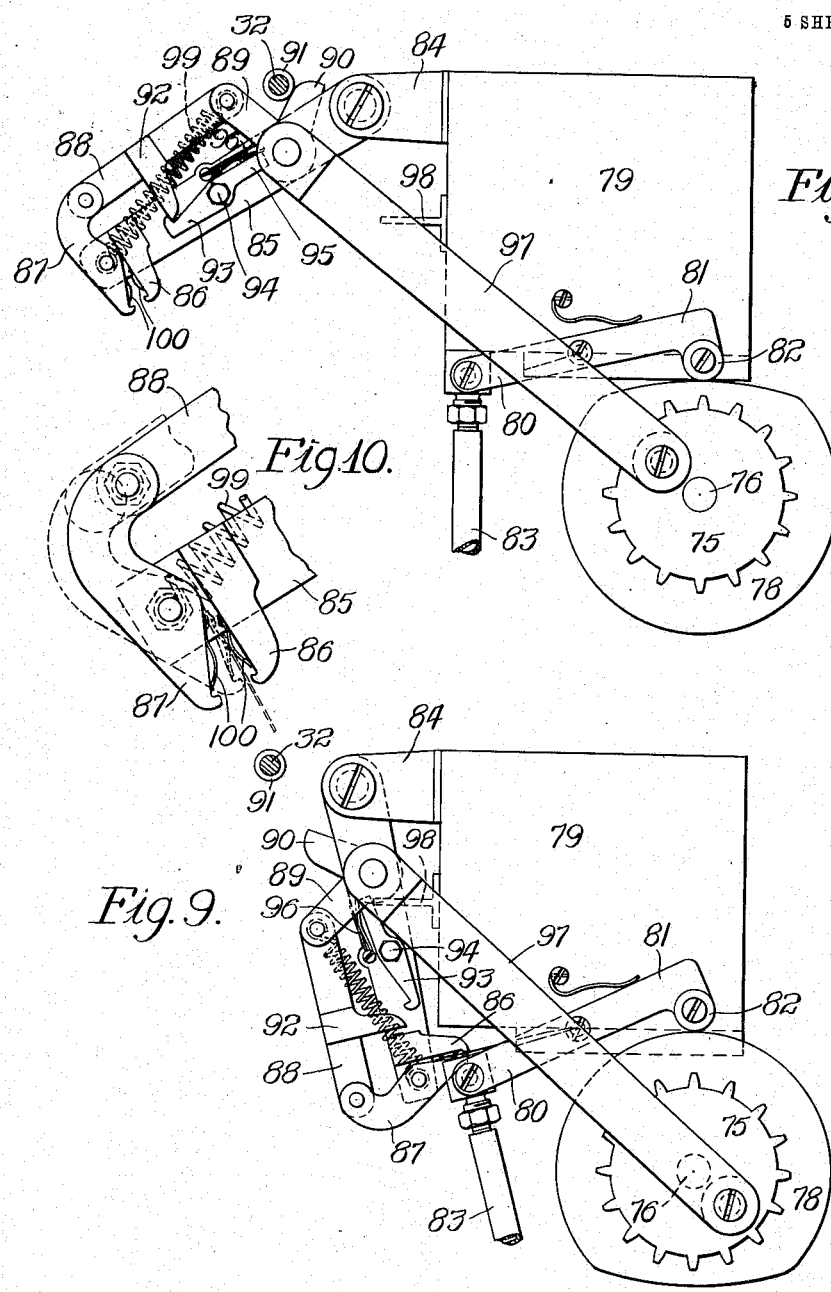

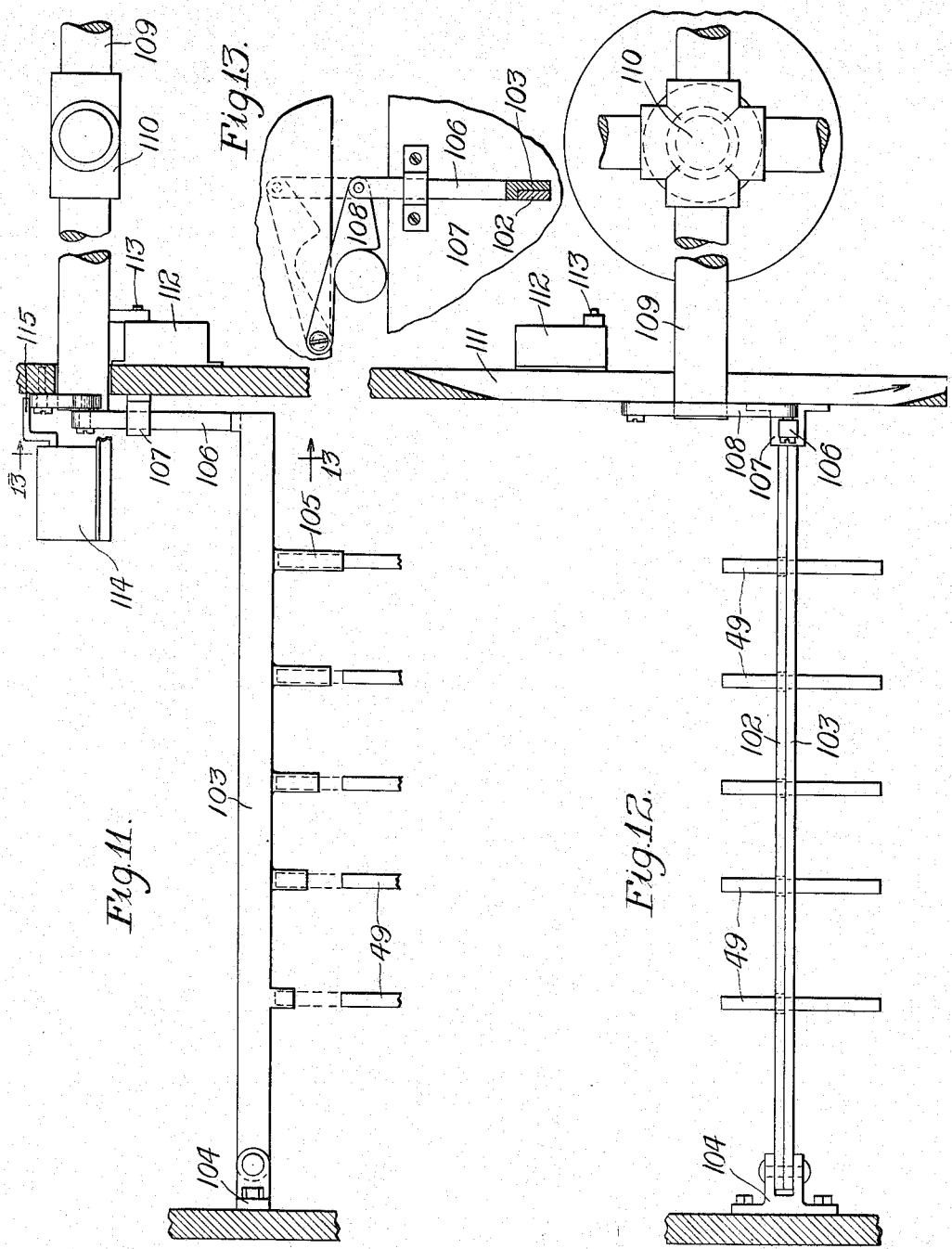

UNITED STATES PATENT OFFICE.

JOSEPH F. PROCK, OF CHICAGO, ILLINOIS.

AUTOMATIC REGISTER.

1,122,029. Specification of Letters Patent. Patented Dec. 22, 1914.

Application filed September 15, 1913. Serial No. 789,855.

*To all whom it may concern:*

Be it known that I, JOSEPH F. PROCK, a citizen of the United States, residing at Chicago, in the county of Cook and State of Illinois, have invented certain new and useful Improvements in Automatic Registers, of which the following is a specification.

This invention relates to mechanism for receiving money, making change, issuing receipts or tickets, etc., and for controlling the passage through a gate of persons whose admission has been paid. I have aimed, therefore, to provide suitable mechanism for accomplishing the above ends which comprises a novel construction and arrangement of parts for making change and delivering the same, for automatically diverting coins from the normal path of travel when the receiving pockets are filled, and for delivering a single ticket or receipt in exchange for each paid admission.

My invention is also characterized, as will be apparent from a study of the specification and drawings, by numerous other features of construction and combinations of parts.

The present device is intended to be used in place of the usual box office where tickets are commonly sold, in place of attendants whose duties are to receive money in payment of admission to a given place, to permit passage of persons whose admissions have been paid through a given place, and for other similar purposes.

The invention is adapted to a large variety of uses, as will hereinafter appear, and may be varied in numerous minor details of construction to suit the special requirements of its use.

Figure 1:
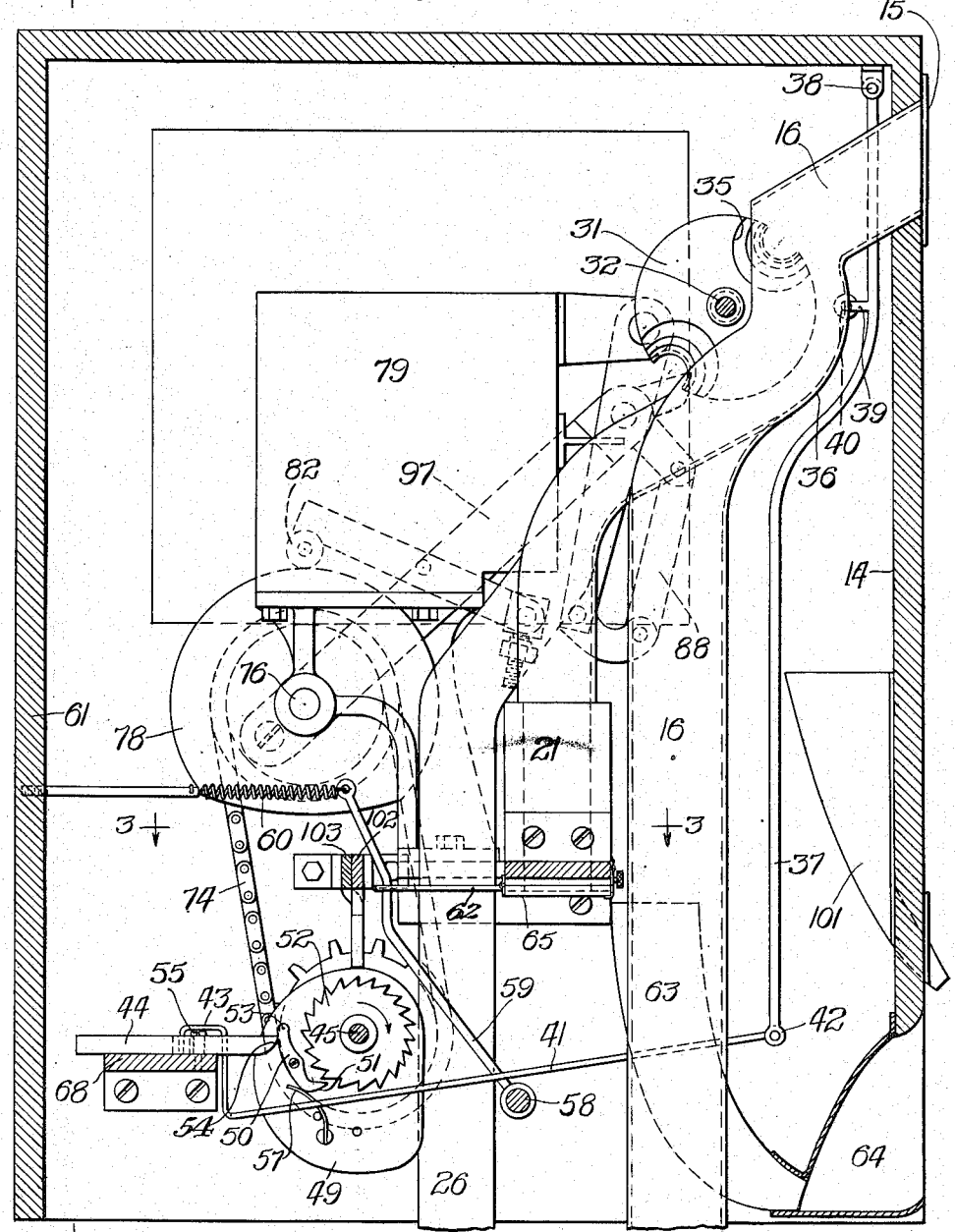
Figure 2:
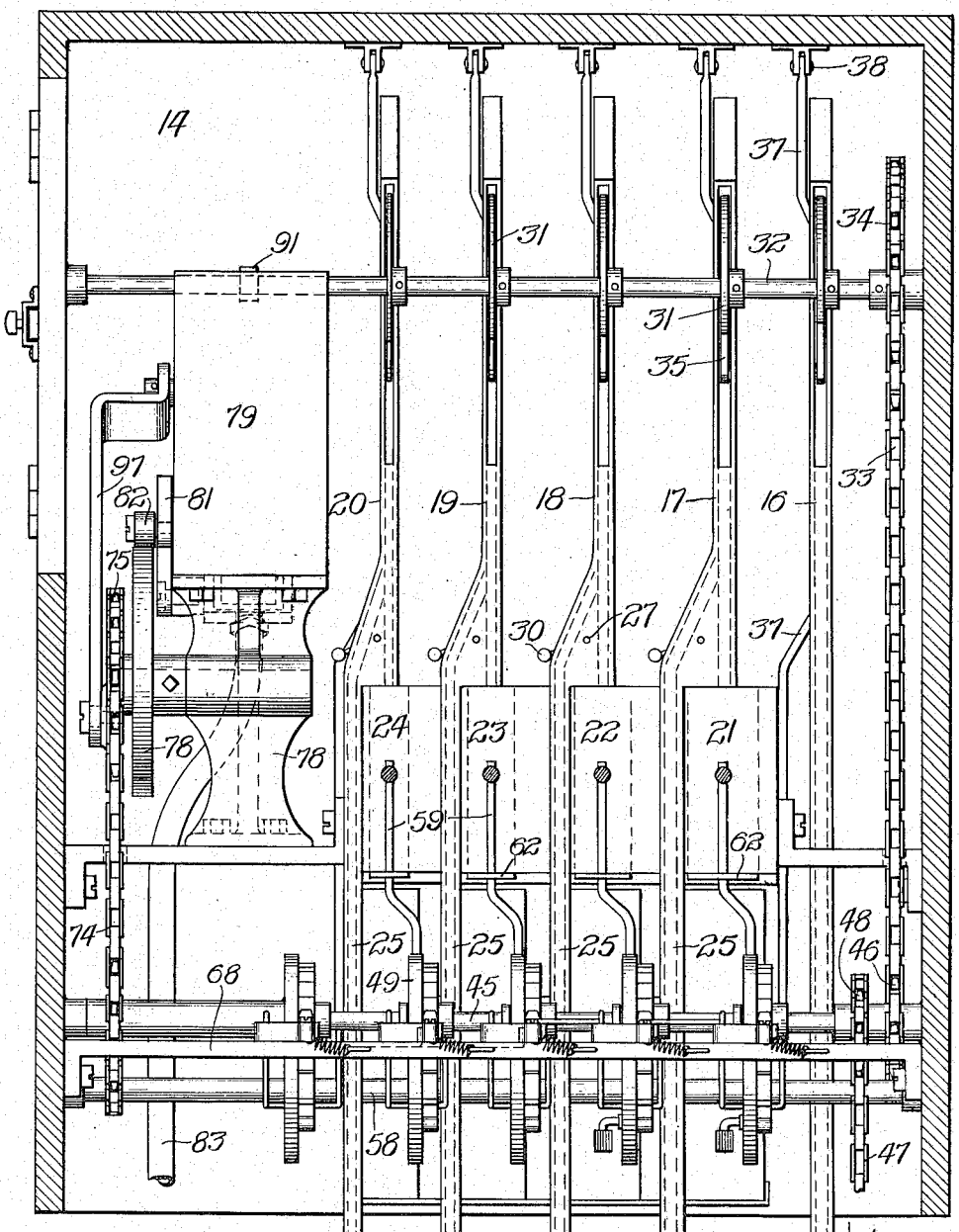
Figure 3:
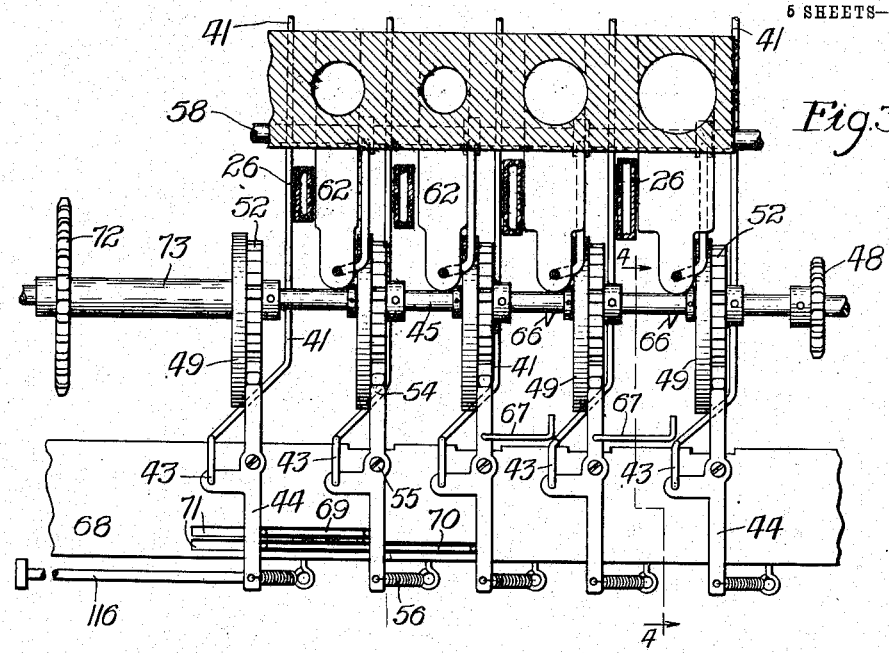
Figure 4:
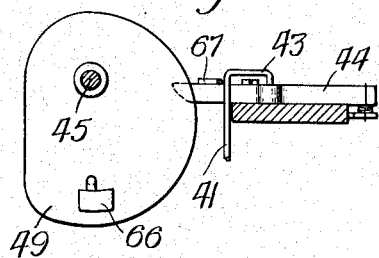
Figure 5:
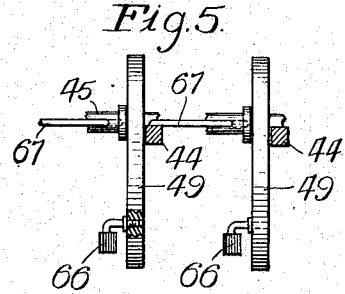
Figure 6:
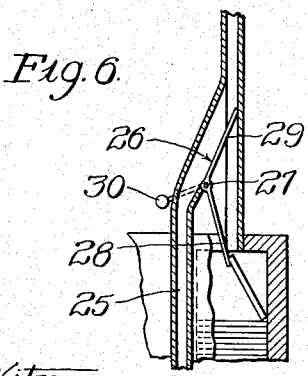
Figure 7:
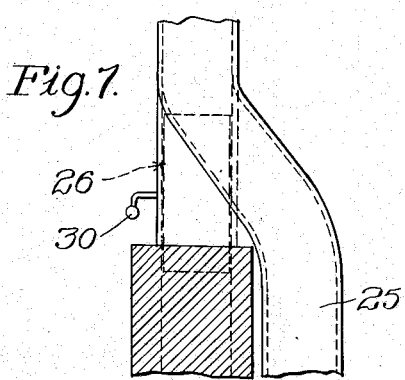

In the drawings: Figure 1 is a vertical cross-section through the device of my invention taken on line 1—1 of Fig. 2 looking in the direction of the arrows; Fig. 2 is a vertical cross-section taken on line 2—2 of Fig. 1 looking in the direction of the arrows; Fig. 3 is a plan view of a portion of the mechanism taken on line 3—3 of Fig. 1 looking in the direction of the arrows; Fig. 4 is a detail of a portion of the mechanism used to effect the making of change, taken on line 4—4 of Fig. 3; Fig. 5 is a view in elevation of the mechanism shown in Fig. 4; Figs. 6 and 7 are details of the shunting device used in the coin chutes to divert passage of coins from their normal course; Fig. 8 is a view in elevation of the ticket or receipt delivery mechanism showing the position of the parts at the end of one movement; Fig. 9 is a view similar to Fig. 8 showing the parts in their position at the end of the opposite movement; Fig. 10 is an enlarged detail of the jaws for taking and delivering receipts; Fig. 11 is a view in elevation of the means used for controlling the passage of persons through a gate, and for registering the number of such persons. Fig. 12 is a plan view, similar to Fig. 11; and Fig. 13 is a detail of the release mechanism for allowing passage of persons whose admissions have been paid.

Referring now particularly to Figs. 1 and 2, I have shown a casing upon the front side 14 of which are arranged a series of slotted openings 15, each for the reception of coins of a different denomination. Each of the openings 15 communicates with a coin chute 16, 17, 18, 19, or 20 (five chutes being illustrated for convenience but this number may be varied to suit conditions), the chute 16 leading directly downward to a point beneath the mechanism casing to discharge coins into a suitable receptacle. The chutes 17, 18, 19, and 20 lead each to a coin pocket 21, 22, 23, and 24 respectively, which are arranged to retain a supply of stacked coins for use in making change.

The chutes 16, 17, 18, 19, and 20 are intended, for convenience in description, to receive dollars, half-dollars, quarters, dimes, and nickels, respectively. It is obvious if the price of a ticket or admission to be purchased is five cents that the correct change from a dollar will be ninety-five cents, and a lesser amount for each smaller coin deposited. In making change, therefore, silver dollars are not required—only coins of smaller denomination. For this reason I have not represented the chute 16 as communicating with a coin pocket, but as leading directly downward to a suitable receptacle or box (not shown).

In order that the chutes may not become congested when the coin pockets have been filled to their capacity, I have provided means for shunting the coins through side chutes 25 to a suitable coin receptacle (not shown). This shunting means, as best appears in Figs. 6 and 7, consists of a plate-like member 26 pivoted as at 27 and having one end 28 thereof extending downwardly into one of the coin pockets, or, if preferred, into the chute itself, and the other end 29 thereof extending upwardly into the chute in which it operates. The member 26 is balanced as by means of a weight 30 to normally hold the upper end 29 out of engagement with coins falling through the chute, and to hold the end 28 in position to engage with passing coins. As each coin passes the lower end 28 the member 26 is momentarily tilted and this tilting action will continue intermittently as long as the level of coins in the coin pocket, or in the chute, does not rise too high. When, however, a sufficient number of coins have collected in any one coin pocket, or chute, to cause a continued engagement between a coin and the lower end 28 of the member 26 (see Fig. 6) the upper end 29 thereof will be advanced into the chute and be held in the path of the next descending coin, whereby the coin is shunted from the straight course which it would normally follow through the side chute 25 to any suitable receptacle or box.

Situated in the path of travel of the coins in each chute is an intercepting disk member 31 secured fixedly to a shaft 32 which may be revolved as by means of a chain 33 passing over a sprocket wheel 34. Each of the disks 31 is provided on diametrically opposite sides with a substantially semi-circular pocket 35 of a proper size to receive a coin passing through the chute. Each coin descending through the chute therefore will abut against the periphery of the disk 31 until, through rotation of the shaft 32, the pocket 35 is revolved into position to receive the coin therein, and to carry it around against an arc shaped surface 36. When the coin has passed along the arc-shaped surface it is disengaged by gravity from the disk member and descends of its own accord either through the chute 16 to the receptacle provided, or through one of the other chutes into one of the coin pockets arranged for its reception.

In operative connection with each of the coin chutes I have provided a lever 37 pivoted as at 38 to the upper portion of the mechanism casing, and having an arm 39 extended therefrom upon the end of which is mounted a roller 40 which projects through a slot (not shown) into the space within the arc-shaped surface 36 to be engaged by a coin passing therethrough. At the lower end 42 of each of the levers 37 a connecting arm 41 is pivoted, the other end 43 of said arm being operatively connected with a lateral projection upon a finger 44. It is intended that a lever arm and finger should be provided one for each of the coin chutes, so that no matter what denomination of coin is deposited in the mechanism, at least one of the fingers 44 will be actuated through the means described.

Extending parallel with the shaft 32 and in proximity to the acting ends of the fingers 44 is a shaft 45. A sprocket wheel 46 secured to one end of this shaft is engaged by the chain 33 which transmits rotary movement from one shaft to the other. A second chain 47 operating over a sprocket wheel 48 on the shaft 45 serves to transmit rotary movement to said shaft from any suitable source of power (not shown) which, if desired, may be located conveniently on a stand or pedestal beneath the mechanism casing. Mounted loosely upon the shaft 45 are a series of cams 49, one for each of the coin chutes previously described. Upon each of these cams a pawl 50 is mounted, the acting end 51 of which is arranged to engage with the teeth of a ratchet wheel 52 fixedly secured to the shaft 45, and the other end 53 of which is arranged normally to be engaged by the acting end 54 of one of the fingers 44. As best shown in Fig. 3 each of the fingers 44 is pivoted as at 55, and normally bears its acting end laterally against one of the cams 49 as well as directly against the end 53 of the pawl 50 to hold the acting end thereof disengaged from the ratchet wheel 52. Whenever the passage of a coin through one of the chutes causes the lever 37 to be moved, and the finger 44 to be laterally swung about the pivot 55 against the tension of a spring 56, the pawl 50 is free to be thrown into engagement with the ratchet wheel 52 through the agency of a leaf spring 57, whereupon the cam 49 makes a complete revolution. Inasmuch as the lateral deflection of the acting end of the finger 44 is momentary only the pawl 50 remains engaged with the ratchet wheel only during one complete revolution, after which it is disengaged by contact with the finger 44. It is apparent, therefore, that for each coin deposited in the mechanism one of the cams 49 will be revolved one complete revolution.

Extending parallel to the shafts 45 and 32 is a stationary shaft 58 to which is loosely secured a series of arms 59, one for each of the cams 49, each of these arms being held normally in retracted position as by means of a spring 60 secured to the rear wall 61 of the mechanism casing. Each of the arms 59 is operatively connected with a plate 62 which is arranged operatively with one of the coin pockets 21, 22, 23 or 24, and, which, with the exception of the plate operating in the pocket 23, is of substantially the same thickness as one of the coins contained therein. The plates 62 are arranged to be reciprocated in the plane of the lowest coin contained within the coin pockets, so that, when an arm 59 is engaged through the revolution of one of the cams 49 the corresponding plate 62 is advanced forward a sufficient distance to shove the lowermost coin in the coin pocket out from beneath the coin stack. The coin, or coins, therefore, which may be displaced from the coin pocket falls into a chute 63 which connects with a common delivery chamber 64 from which the change may be removed by hand. The coin pockets 21, 22, 23, and 24 are preferably arranged with a common bottom 65 hinged to permit removal of the coins therefrom whenever this may be desired.

It is apparent if the price of admission or a ticket be five cents, that the change to be returned from a dollar should preferably consist of a half dollar, a quarter, and two dimes, and that the change from a half dollar should consist of a quarter and two dimes. Likewise from a quarter the proper change should be two dimes, and from a dime a nickel should be returned. In order that only the proper plates 62 may be actuated to thrust out coins of suitable denomination to make correct change under all conditions, I have provided mechanism for successively actuating the proper cams 49. As may be seen best by reference to Figs. 3, 4, and 5, upon one side of each of the two cams 49 at the right hand end of the shaft 45 (see Fig. 3) there is provided an obliquely disposed catch 66 arranged when the cam is revolved to engage with one end of a hook 67, the other end of which is secured to the adjacent finger 44 on the left. Because of the oblique or beveled surface on the inner side of the catch the hook will be moved endwise to cause displacement of the acting end of the finger to which it is connected, thereby bringing about rotation of the cam located to the left of that cam which was first revolved. It will be noted that but two of the cams (those on the right end of the shaft 45) are provided with catches and that there are but two fingers 44 arranged with hooks. When a dollar has been deposited in the mechanism, the finger 44 appearing to the right hand side of Fig. 3 will be actuated, whereby a fifty cent coin is thrust out in change. Movement of the cam at the right end of the shaft 45 will cause one of the hooks 67 to move the finger 44 on the left whereby its corresponding cam is revolved and a twenty-five cent coin is delivered in change. Movement of this cam in turn causes the other hook 67 to be actuated whereby the next adjacent cam to the left is revolved to thrust out two ten cent coins, this being possible because the plate 62 which operates to displace coins from the dime pocket has a thickness substantially equal to two dimes, so that not less than twenty cents at one time is displaced for change. Since no connection exists between the mechanism for displacing dimes and nickels, no further change will be delivered. Precisely the same operations take place when a fifty cent coin is dropped into the mechanism, except that the cam next to that on the right hand end is the first to be actuated. From the foregoing it will be observed that, whenever a coin of more than ten cents in value is deposited in the mechanism at least two cams are successively rotated to effect a discharge of the proper amount of change.

I have arranged mechanism operable through movement of the fingers 44 for delivering a ticket or receipt for each paid admission. Arranged upon the support 68 to which each of the fingers 44 is secured are two members 69 and 70, the right hand ends of which are designed one to engage with each of the fingers 44 controlling the discharge of five and ten cent coins, and the left hand ends both to engage with the left most finger 44. These members 69 and 70 are made to travel preferably in guides or grooves 71 so as not to become laterally displaced. As previously explained, at least one of the two fingers 44 controlling the discharge of five and ten cent coins will be actuated for every operation of change, so that the finger 44 at the extreme left hand side of Fig. 3 will be moved with the passage of every coin, through the medium of one of the members 69 and 70, to cause rotation of the cam 49 with which it engages. The cam 49 at the left hand side of Fig. 3 is secured to a sprocket wheel 72 as through the medium of a sleeve 73 revoluble upon the shaft 45, and serves to cause one complete revolution of the sprocket 72 whenever the left most finger 44 is actuated. A chain 74 engaging with the sprocket wheel 72 passes over and engages with a sprocket wheel 75 to operate the ticket or receipt mechanism. It is to be understood that the sprocket wheels 72 and 75 are of the same size and revolve in unison. A shaft 76 which is suitably journaled within a support 77 carries the sprocket wheel 75 and a cam 78. Mounted on the support 77 is a container 79 within which a supply of receipts or tickets may be stacked. The forward portion 80 of the bottom of said container is pivotally arranged as appears from Figs. 8 and 9, and may be downwardly swung through the medium of an arm 81 to the end of which is attached a roller 82 adapted to be engaged by the periphery of the cam 78. It is intended that the receipts or tickets placed within the container 79 shall be sufficiently flexible to permit the lowermost ticket to be downwardly bent with movement of the swinging portion 80 of the container bottom. Through a suitable flexible connection 83 a vacuum pressure is maintained at the forward end of the hinged portion 80, so as to draw tightly thereto the lowermost receipt or ticket. It is intended that the suction pressure acting upon the lowermost slip shall be distributed through at least two ports arranged on opposite sides of the member 80 and arranged to provide a gap or opening therebetween.

Pivotally secured to a suitable bracket 84 is a swinging arm 85 carrying at its lower end a fixed jaw 86 and a swinging jaw 87. A link 88 secured to the swinging jaw connects the same with a bell crank 89, one edge 90 of which is rounded and acts as a cam to engage with a roller 91 which may be secured loosely to the shaft 32. A finger 92 is carried on the link and is arranged to engage its acting end with a trigger 93 pivotally secured to the arm 85 as at 94 and having one end 95 thereof engaged by a leaf spring 96 to maintain the acting end of the trigger in engagement with the finger 92. Operatively connected with the sprocket wheel 75 and with the arm 85 in connecting rod 97 arranged to cause oscillation of the arm 85 with each revolution of said sprocket wheel. A projecting finger 98 secured to the front of the container 79 serves with oscillation of the arm 85 to trip the end 95 of the trigger to disengage the acting end thereof from the finger 92, whereupon the jaws are free to snap together through the agency of a spring 99. The acting faces of each of the jaws are preferably each provided with leaf spring 100 arranged to yieldingly seize therebetween a single ticket or receipt.

From the foregoing description it is apparent that with each revolution of the sprocket wheel 75 the arm 85 will be downwardly swung so that the jaws 86 and 87 will assume the position shown in Fig. 9. Concurrently with this movement the lower portion 80 of the bottom of the container is maintained in a downwardly swung position, the vacuum pressure through the tube 83 bending downwardly only the lowermost receipt or ticket, so that the jaws 86 and 87 may lie one on each side of said ticket when the parts have assumed the position shown in Fig. 9. When the arm 85 is close to the end of its downwardly swinging movement the projecting finger 98 engages with the trigger to release its acting end from the finger 92, whereby the jaws are snapped together to seize hold of the ticket, and retain the same therebetween as the arm 85 is swung back into the position shown in Fig. 8. With the completion of the upward swinging movement the cam edge 90 of the bell crank 89 will engage with the roller 91 to separate the two jaws, allowing the trigger 93 to be engaged by the acting end of the finger 92 so that the jaws are held apart, and allowing a ticket or receipt to fall by gravity into any suitable slide or trough 101 through which it is delivered within reach of the purchaser. To facilitate the loading of the container with tickets or receipts a door may be arranged in the side of the mechanism casing to permit ready access to the interior thereof.

Referring to Fig. 11, I have shown two bars 102 and 103 extending from one side wall of the mechanism casing to the other, both being pivoted to a common bracket 104 at one side thereof. These bars are each mounted directly above the shaft 45 and cams 49 carried thereon, and have projecting lugs 105 on the lower side thereof, arranged to be engaged by the cams 49 when the same are rotated. It will be observed that each of the lugs 105 is of different length, depending upon its distance from the pivotal point of the bars, the object being to provide for an equidistant upward swinging movement of said bars, regardless of which cam may be actuating the same. The rod 102 is provided with four lugs 105, one for each of the cams 49 to the right hand side of Fig. 3, and the rod 103 with one lug arranged to be engaged by the cam 49 to the left side of said figure. A rod 106, arranged to slide vertically within a suitable guide 107, is moved upwardly with each oscillation of the bars 102 or 103, and is pivoted at its upper end to a latch member 108, best shown in Fig. 13. It is intended that the latch member 108 shall coöperate with one of the arms 109 of a turnstile 110 to permit rotation of the same through a predetermined distance. For this purpose, a slot 111 is provided in the side wall of the mechanism casing adjacent to the turnstile 110 and in the plane of its arms 109, through which the ends of the arms 109 may revolve. If desired, a register 112 may be provided upon the outside of the mechanism casing with a finger 113 arranged to be engaged successively by each of the arms 109 at the turnstile, so as to cause a record to be made of each person who is admitted through the stile. Likewise another register 114 may be positioned within the mechanism casing, as is indicated in Fig. 11, arranged with a finger 115 to be engaged by each movement of the latch member. It is intended that this latter register shall record each payment of money into the mechanism. When, as is indicated in Fig. 3, a push rod 116 is attached to the leftmost finger 44 which may be manipulated from the exterior of the mechanism casing, it is possible for an attendant to have delivered from the mechanism a ticket, receipt, or transfer, which through the agency of the bar 103 causes a record of such delivery to be made in the register 114.

The mechanism which has been described is shown as capable of effecting change from coins of different denominations when the price of a ticket or admission is five cents. With slight adjustments the same mechanism can be utilized to effect change where the price of admission or ticket is ten cents. In such a case it will be necessary instead of discharging two dimes at one time from the coin pocket 23 to discharge one dime and one nickel, the means for accomplishing this being a similar catch and hook to that which is shown in operative relation on the right hand end of Fig. 3. It is contemplated, furthermore, in adjusting the parts that the positions of the catches and other parts shall be such as to permit as little lost motion as is possible in order that the operation of the machine may be expedited.

It is, of course, apparent that the device herein described is capable of use either as to all of its parts or as to only a portion thereof, since for some purposes no receipts, tickets, or transfers would be desired, and for other purposes means for controlling the passage of persons through a gate would not be necessary.

I claim:

1. An automatic register comprising, in combination, a plurality of coin receiving chutes, coin discharging mechanism embodying a plurality of coin pockets, one communicating with the discharge end of each of said coin receiving chutes, reciprocal thrust plates arranged one to discharge a given amount of change from each of said coin pockets, and means for actuating certain of said thrust plates to discharge the proper amount of change, continuously operating means for actuating said discharging mechanism, and other means for controlling the actuation of said discharging mechanism adapted to be operated by passage of a coin through its intended chute, substantially as described 2. In an automatic register, money changing and discharging mechanism comprising a plurality of pockets each for the reception of coins of a different denomination, a thrust plate one for each of said pockets and arranged to discharge a predetermined amount of change therefrom, a series of loosely mounted cams one for each of said thrust plates, an operative connection between said cams and said thrust plates, whereby movement of any one cam produces a reciprocation of its corresponding thrust plate, a revolving ratchet wheel adjacent each of said cams, engaging means between each of said cams and ratchet wheels whereby the cams may be caused to revolve, and means for successively actuating said cams to cause delivery of change as required, substantially as described.

3. An automatic register, comprising in combination a plurality of coin receiving chutes, coin changing and discharging mechanism, and means for actuating said mechanism comprising disks arranged one for each of said chutes to revolve a portion of its periphery therein and provided with one or more peripheral openings within which a coin may seat, a plurality of swingingly mounted levers, a roller carried one by each of said levers and arranged to lie partly within the adjacent coin receiving chute in proximity to the periphery of said disk whereby the coins passed through said chute engage with said roller to displace the lever to which it is connected, and a connection between the swinging end of each of said levers and said coin changing and discharging mechanism to actuate the same, substantially as described.

4. In an automatic register, means for discharging a requisite number of coins comprising a rotatable shaft, a plurality of cams loosely mounted on said shaft, a plurality of members fixedly secured to said shaft one for each of said cams and situated adjacent thereto, means for causing any selected of said members to engage with the adjacent cam whereby rotary movement is imparted thereto, a plurality of coin pockets each for the reception of coins of a different denomination, and means operated by movement of said cams for discharging coins therefrom, substantially as described.

5. In an automatic register, coin changing mechanism comprising a rotatable shaft, a plurality of cams loosely mounted thereon, a plurality of members one for each of said cams and adjacent thereto fixedly secured to said shaft, means for causing an engagement between any selected of said cams and its adjacent member, said means serving also to disengage said cam from said member at the end of one revolution, substantially as described.

6. In an automatic register, coin changing mechanism comprising a rotatable shaft, a plurality of cams loosely mounted on said shaft, a plurality of members one for each of said cams and adjacent thereto fixedly secured to said shaft, and a locking connection arrangeable between each of said cams and its adjacent member, a plurality of coin receiving chutes, and means operated by the passage of a coin through any of said chutes for actuating one of the said locking connections to cause rotation of a selected cam, substantially as described.

7. In an automatic register, a rotatable shaft, a plurality of cams loosely mounted on said shaft, a plurality of members one for each of said cams and adjacent thereto fixedly secured to said shaft, means for locking any selected of said cams to its adjacent member, a plurality of coin receiving chutes, means actuated by the passage of coins through any of said chutes for operating any selected of said locking means, and means operable by rotation of one cam for locking the adjacent cam to its member, substantially as described.

8. An automatic register, comprising in combination a plurality of coin receiving chutes, each arranged to receive coins of a different denomination, coin changing and discharging mechanism embodying a plurality of coin pockets, one communicating with the discharge end of each of said coin receiving chutes, means for discharging from said pockets change as required, said means comprising a rotatable shaft, a plurality of cams loosely mounted thereon one for each of said pockets, a plurality of members fixedly secured to said shaft, one for each of said cams and adjacent thereto, means for causing any selected of said members to engage with the adjacent cam to rotate the same, said means serving also to disengage said cam and member at the end of one revolution, a thrust plate operable in each of said coin pockets by movement of any selected of said cams for discharging one or more coins from said pockets, and means for successively rotating one or more cams whereby coins are discharged from one or more pockets as required, substantially as described.

JOSEPH F. PROCK.

Witnesses:
STANLEY A. BARING,
WM. HUNT.